US009411448B2

(12) United States Patent
Lin et al.

(10) Patent No.: US 9,411,448 B2
(45) Date of Patent: Aug. 9, 2016

(54) TOUCH DISPLAY APPARATUS (71) Applicant: InnoLux Corporation, Jhu-Nan, Miao-Li County (TW)

(72) Inventors: Kuan-Li Lin, Jhu-Nan (TW); Wen-Jyh Sah, Jhu-Nan (TW); Cheng-Hsia Kuo, Jhu-Nan (TW)

(73) Assignee: INNOLUX CORPORATION, Jhu-Nan, Miao-Li County (TW)

( * ) Notice: Subject to any disclaimer, the term of this patent is extended or adjusted under 35 U.S.C. 154(b) by 180 days.

(21) Appl. No.: 14/222,079

(22) Filed: Mar. 21, 2014

(65) Prior Publication Data

US 2014/0285735 A1 Sep. 25, 2014

Related U.S. Application Data

(60) Provisional application No. 61/804,475, filed on Mar. 22, 2013.

(30) Foreign Application Priority Data

Jul. 17, 2013 (TW) .............................. 102125562 A (51) Int. Cl.
*G02F 1/1335* (2006.01)
*G06F 3/041* (2006.01)
*G06F 1/16* (2006.01)
*G02F 1/1333* (2006.01)

(52) U.S. Cl.
CPC ............ *G06F 3/041* (2013.01); *G02F 1/13338* (2013.01); *G06F 1/1643* (2013.01); *G02F 2202/28* (2013.01)

(58) Field of Classification Search
CPC .............................. G06F 1/1643; G06F 3/0416
USPC ............................................. 349/12; 345/173
See application file for complete search history.

(56) References Cited

U.S. PATENT DOCUMENTS

| 6,016,134 | A | * | 1/2000 | Ota | G02F 1/13338 178/18.03 |
| 2011/0199334 | A1 | * | 8/2011 | Hwang | G06F 3/045 345/174 |
| 2011/0242017 | A1 | * | 10/2011 | Kang | G06F 3/044 345/173 |
| 2013/0154994 | A1 | * | 6/2013 | Yang | G06F 3/044 345/174 |

FOREIGN PATENT DOCUMENTS

TW 200930280 A 7/2009

* cited by examiner

*Primary Examiner* — Thanh-Nhan P Nguyen
(74) *Attorney, Agent, or Firm* — Muncy, Geissler, Olds & Lowe, P.C.

(57) ABSTRACT

A touch display apparatus comprises a display panel, a touch panel, a functional film and an adhesive element. The touch panel is disposed opposite the display panel and includes a first surface facing the display panel. The functional film is disposed on the first surface of the touch panel and includes an outer edge. The adhesive element is disposed at an edge of at least one of the display panel and the touch panel and adheres to the display panel and the touch panel. The adhesive element includes an inner edge, and a minimum distance between the inner edge and the outer edge is between 0 and 10 mm.

18 Claims, 5 Drawing Sheets

TOUCH DISPLAY APPARATUS

CROSS REFERENCE TO RELATED APPLICATIONS

This application claims the priority benefit of U.S. provisional application Ser. No. 61/804,475 filed on Mar. 22, 2013, and a Patent Application No. 102125562 filed in Taiwan on Jul. 17, 2013. The entirety of the above-mentioned patent applications is hereby incorporated by reference herein and made a part of specification.

BACKGROUND OF THE INVENTION

1. Field of Invention

The invention relates to a touch display apparatus.

2. Related Art

With the progress of technologies, various novel information apparatuses, such as cell phones, tablet computers, ultrabooks and GPS navigation apparatuses, are invented. Generally, a keyboard and mouse are commonly used to manipulate the information apparatus for inputting information. Nevertheless, the touch control technology currently also becomes a popular manipulation method for the information apparatus and brings an intuitive operation. Accordingly, a touch display apparatus using the touch control technology can provide a friendly and intuitive interface for the input operation, and therefore a user can manipulate the touch display apparatus by fingers or a stylus.

In general, the touch display apparatus can be divided into an in cell touch display apparatus and an on cell touch display apparatus. In the in cell touch display apparatus, a sensing electrode layer is disposed in a display panel (e.g. LCD panel); otherwise, in the on cell touch display apparatus, a touch panel including a sensing electrode layer is disposed on a display panel.

SUMMARY OF THE INVENTION

An objective of the invention is to provide a touch display apparatus with an innovative structure.

A touch display apparatus according to the invention comprises a display panel, a touch panel, a functional film and an adhesive element. The touch panel is disposed opposite the display panel and includes a first surface facing the display panel. The functional film is disposed on the first surface of the touch panel and includes an outer edge. The adhesive element is disposed at an edge of at least one of the display panel and the touch panel and adheres to the display panel and the touch panel. The adhesive element includes an inner edge, and a minimum distance between the inner edge and the outer edge is between 0 and 10 mm.

In one embodiment, the minimum distance between the inner edge and the outer edge is between 0.1 mm and 5 mm.

In one embodiment, the display panel includes a first substrate, a second substrate and an optical film, the first substrate and the second substrate are disposed oppositely, and the optical film is disposed on the surface of the second substrate facing the touch panel.

In one embodiment, a minimum distance between the functional film and the optical film is between 0 and 0.3 mm.

In one embodiment, the functional film includes a first insulation layer and an adhesive layer.

In one embodiment, the functional film has an anti-scattering function.

In one embodiment, the material of the first insulation layer of the functional film includes polyethylene terephthalate (PET), triacetyl cellulose (TAC), poly-methylmethacrylate (PMMA) or their any combination.

In one embodiment, the touch display apparatus further comprises a conductive layer covering the first insulation layer of the functional film.

In one embodiment, the conductive layer is electrically connected to a ground terminal.

In one embodiment, the touch display apparatus further comprises a ground conductive layer, and the conductive layer is electrically connected to a ground terminal through the ground conductive layer.

In one embodiment, the ground conductive layer is electrically connected to the conductive layer through a conductive adhesive material.

In one embodiment, the conductive adhesive material is disposed at the edge of the conductive layer and contacts the conductive layer.

In one embodiment, the first insulation layer of the functional film has a through hole, and the conductive adhesive material extends to cover the conductive layer via the through hole.

In one embodiment, the first insulation layer of the functional film has a through hole, and the conductive layer is electrically connected to the ground conductive layer via the through hole.

In one embodiment, the touch display apparatus further comprises an anti-electrostatic discharge layer which is adjacent to the edge of the ground conductive layer and electrically connected to another ground terminal.

In one embodiment, the touch panel further includes a second insulation layer and a conductive structure layer.

In one embodiment, the touch display apparatus further comprises an anti-electrostatic discharge layer which is adjacent to the edge of the functional film and electrically connected to a ground terminal.

In the touch display apparatus of the invention, the functional film is disposed on the first surface of the touch panel, and the adhesive element is disposed at the edges of the display panel and touch panel and adheres to the display panel and touch panel. The adhesive element has an inner edge, and a minimum distance between the inner edge and an outer edge of the functional film is between 0 and 10 mm. Accordingly, a touch display apparatus with an innovative structure is provided by this invention.

Besides, in one embodiment of the invention, the functional film includes a first insulation layer and an adhesive layer. The first insulation layer adheres to the first surface of the touch panel via the adhesive layer, and the functional film has an anti-scattering function. Thereby, the touch display apparatus is provided with an anti-scattering function. In another embodiment of the invention, in addition to the functional film having an anti-scattering function, the touch display apparatus can further include a conductive layer, which covers the first insulation layer of the functional film. Accordingly, by the configuration of the functional film and conductive layer, the touch display apparatus can be capable of preventing both of the signal interference and scattering. In another embodiment of the invention, the touch panel further includes a second insulation layer and a conductive structure layer, and the conductive structure layer is disposed between the second insulation layer and the functional film. Thereby, the touch display apparatus can be capable of preventing both of the signal interference and scattering.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
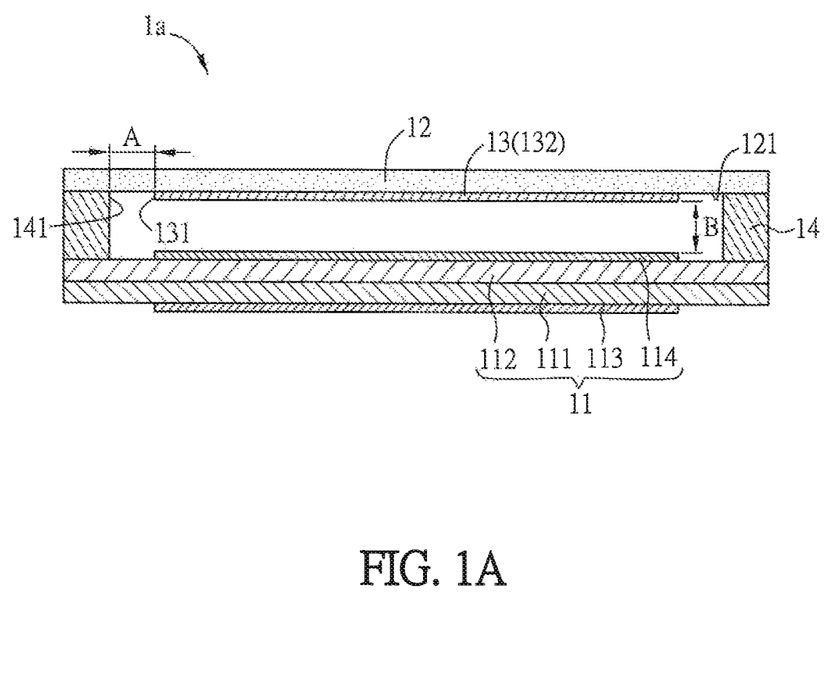
FIG. 1A is a schematic sectional diagram of a touch display apparatus according to a preferred embodiment of the invention.

FIG. 1A is a schematic sectional diagram of a touch display apparatus 1a according to a preferred embodiment of the invention.

The touch display apparatus 1a includes a display panel 11, a touch panel 12, a functional film 13 and an adhesive element 14.

The display panel 11 includes a first substrate 111, a second substrate 112 and an optical film. The first substrate 111 and the second substrate 112 are disposed oppositely. The display panel 11 can be a liquid crystal display (LCD) panel or an organic light emitting diode (OLED) display panel. In this embodiment, the display panel 11 is an LCD panel for example. The materials of the first substrate 111, second substrate 112 and touch panel 12 can include glass, and they can be made by the same or different glass. The size relationship between the first and second substrates 111 and 112 is not limited in this invention. In other words, the area of the second substrate 112 can be less than, equal to or larger than that of the first substrate 111. Herein for example, a side length of the second substrate 112 is equal to that of the first substrate 111 and touch panel 12.

In this embodiment, the first substrate 111 is a thin film transistor (TFT) substrate, and the second substrate 112 is a color filter (CF) substrate, for example. However, in other embodiments, the black matrix layer or filter layer of the color filter substrate also can be removed to the TFT substrate, and thus the first substrate 111 becomes a BOA (BM on array) substrate or COA (color filter on array) substrate. However, the invention is not limited thereto. Besides, the display panel 11 can further include a liquid crystal layer (not shown), which is disposed between the first and second substrates 111 and 112.

The optical film is disposed on the surface of the second substrate 112 that faces the touch panel 12. In other words, the optical film is disposed on the surface of the second substrate 112 and between the second substrate 112 and the touch panel 12. The display panel 11 has two optical films 113 and 114 for example. Herein, the optical film 113 is a lower polarization plate and the optical film 114 is an upper polarization plate. The optical film 113 is disposed on the side of the first substrate 111 away from the second substrate 112, and the optical film 114 is disposed between the second substrate 112 and the touch panel 12. Herein, the optical film 113 is disposed on the lower surface of the first substrate 111, and the optical film 114 is disposed on the upper surface of the second substrate 112. However, such configuration can be changed in other embodiments. For example, if the display panel 11 is an OLED display panel, only one optical film is required, and it can be, for example but not limited to, a ¼λ circular polarizer and disposed on the second substrate 112 and between the second substrate 112 and the touch panel 12.

The area of the optical film 113 is less than that of the first substrate 111, and the area of the optical film 114 is less than that of the second substrate 112. However, in other embodiments, the area of the optical film 113 can be equal to that of the first substrate 111, and the area of the optical film 114 can be equal to that of the second substrate 112.

The touch panel 12 is disposed above the display panel 11. Herein, the touch panel 12 includes a touch substrate and at least one sensing electrode layer (not shown) disposed on the touch substrate, and a control IC for controlling the touch panel 12 is not disposed at the touch panel 12. The touch panel 12 is disposed opposite the display panel 11, and is disposed on the display panel 11 by adhesion. The touch panel 12 has a first surface 121, which faces the display panel 11.

In this embodiment, as shown in FIG. 1A, the touch panel 12 doesn't directly contact the optical film 114, but instead adheres to the display panel 11 via the adhesive element 14. The adhesive element 14 is disposed at edges of at least one of the display panel 11 and the touch panel 12. Herein, the touch panel 12 and the display panel 11 are connected to each other by air bonding. In detail, the adhesive element 14 can have an annular shape and is disposed at the four edges of the upper surface of the second substrate 112. Otherwise, the adhesive element 14 can be disposed at a portion of the edges. Otherwise, it can be disposed in a paste dispensing way. Accordingly, an interval can be kept between the display panel 11 and the touch panel 12. Because the area of the optical film 114 is less than that of the second substrate 112, the optical film 114 is located within the interval that is formed between the second substrate 112 and the touch panel 12, and the adhesive element 14 is located outside the optical film 114. Herein, the adhesive element 14 has an inner edge 141.

The functional film 13 is disposed on the first surface 121 of the touch panel 12, and has an outer edge 131. In this embodiment, the functional film 13 includes a first insulation layer 132 and an adhesive layer (not shown). The functional film 13 is an anti scattering film (ASF) to prevent the scattering from occurring. The first insulation layer 132 adheres to the first surface 121 of the touch panel 12 via the adhesive layer. The material of the first insulation layer 132 of the functional film 13 can include, for example but is not limited to, polyethylene terephthalate (PET), triacetyl cellulose (TAC), poly-methylmethacrylate (PMMA) or their any combination. Because the functional film 13 (ASF) is disposed on the first surface 121 of the touch panel 12, the shatters of the touch panel 12 can be prevented from flying out and harming the components of the touch display apparatus 1a (such as the display panel 11 or the circuit board) or the user when the touch panel 12 is broken accidentally.

As shown in FIG. 1A, a minimum distance A between the inner edge 141 of the adhesive element 14 and the outer edge 131 of the functional film 13 can be between 0 and 10 mm. Preferably, the minimum distance A is between 0.1 mm and 5 mm. Besides, a minimum distance B between the functional film 13 and the optical film 114 can be between 0 and 0.3 mm. Herein, if the minimum distance B is zero, it means that the functional film 13 and the optical film 114 are connected to each other.

Figure 1B:
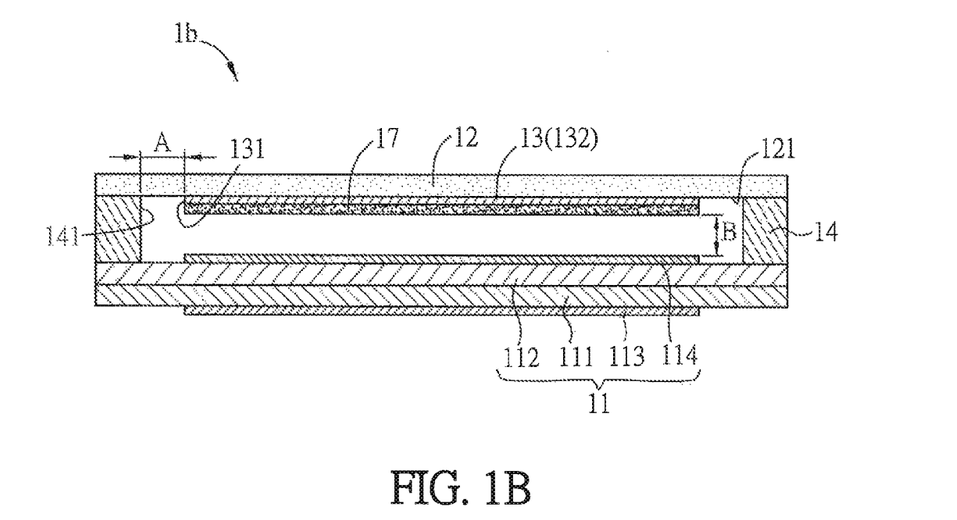
FIGS. 1B and 1C are schematic sectional diagram of two variations of the touch display apparatus according to the preferred embodiment of the invention.
Figure 1C:
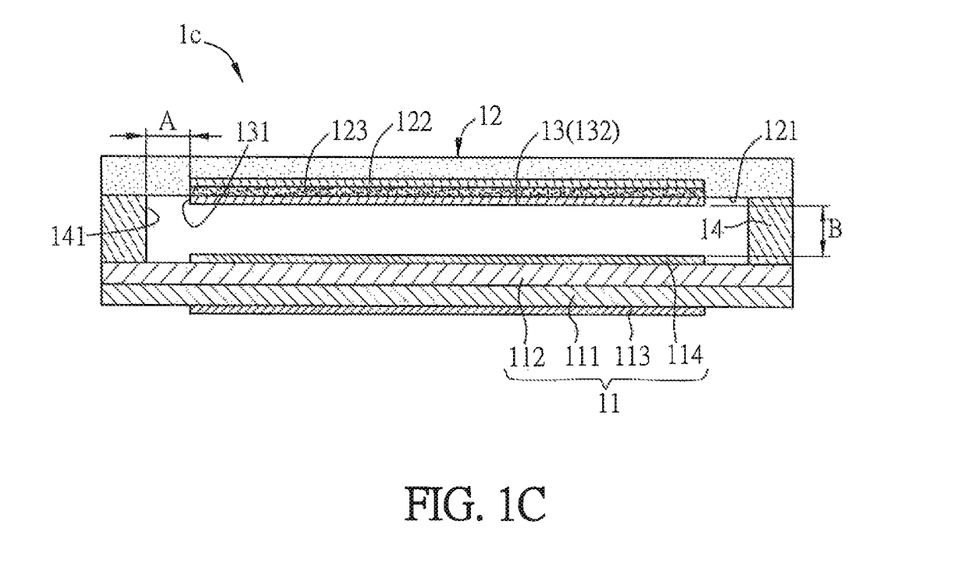

FIGS. 1B and 1C are schematic sectional diagrams of the touch display apparatuses 1b and 1c, respectively, as two variations according to the preferred embodiment of the invention.

As shown in FIG. 1B, mainly different from the touch display apparatus 1a in FIG. 1A, the touch display apparatus 1b further includes a conductive layer 17, which covers the functional film 13. Herein, the functional film 13 and the conductive layer 17 can be sequentially disposed on the first surface 121 of the touch panel 12. The conductive layer 17 can be, for example but is not limited to, a transparent conductive layer or a metal grid, and is electrically connected to a ground terminal (not shown). Herein, the ground terminal can be disposed on the touch panel 12 or an external circuit. The material of the conductive layer 17 is, for example but not limited to, indium-tin oxide (ITO), indium-zinc oxide (IZO) or metal (such as nano silver). Herein as an embodiment, the conductive layer 17 is a transparent conductive layer, and the material thereof is ITO. By the configuration of the functional film 13 (ASF) and conductive layer 17 (capable of signal isolation), the touch display apparatus 1c is capable of an anti-scattering function and blocking the signal from interfering with the operation of the touch panel 12 for avoiding the erroneous operation of the touch panel 12. The technical features of other components of the touch display apparatus 1b can be known by referring to the same components of the touch display apparatus 1a, and therefore they are not described here for conciseness.

As shown in FIG. 1C, mainly different from the touch display apparatus 1a in FIG. 1A, the touch panel 12 of the touch display apparatus 1c further includes a second insulation layer 122 and a conductive structure layer 123. Herein, the conductive structure layer 123 is disposed between the second insulation layer 122 and the functional film 13. Otherwise, the positions of the second insulation layer 122 and conductive structure layer 123 can be exchanged with each other. When the conductive structure layer 123 is disposed between the second insulation layer 122 and the functional film 13, the second insulation layer 122 is a passivation layer, and the conductive structure layer 123 is, for example but not limited to, a transparent conductive layer. The material of the conductive structure layer 123 is, for example but not limited to, indium-tin oxide (ITO) or indium-zinc oxide (IZO). Herein as an embodiment, the conductive structure layer 123 is a transparent conductive layer, and the material thereof is ITO. By the configuration of the conductive structure layer 123, the touch panel 12 is capable of preventing the signal interference. Besides, by the configuration of the functional layer 13, the touch display panel 1c is capable of preventing both of the signal interference and the scattering. Otherwise, when the second insulation layer 122 (such as a passivation layer) is disposed between the conductive structure layer 123 (such as an electrode layer) and the functional film 13, the touch display apparatus 1c is capable of an anti-scattering function. The technical features of other components of the touch display apparatus 1c can be known by referring to the same components of the touch display apparatus 1a, and therefore they are not described here for conciseness.

Figure 2:
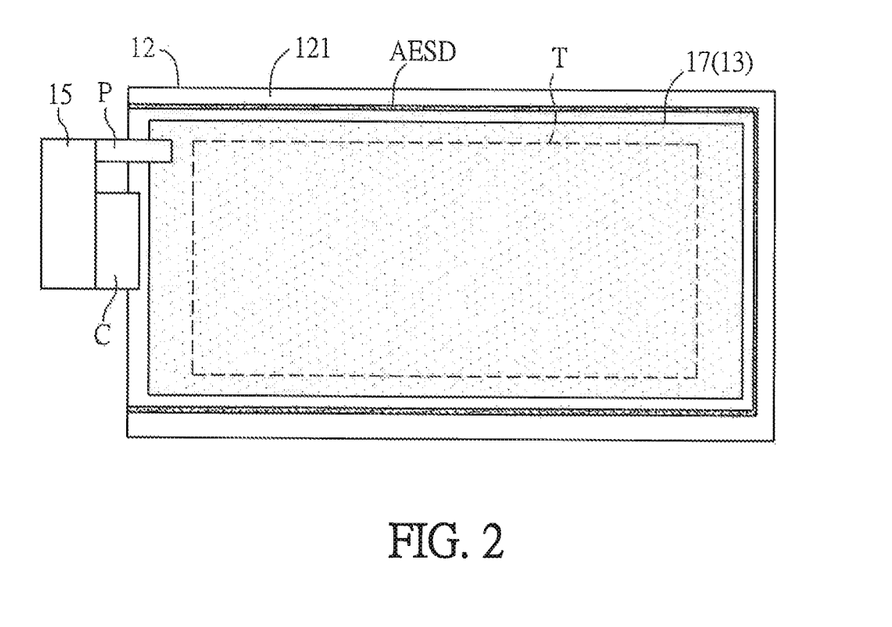
FIG. 2 is a schematic top view of the touch display apparatus according to another variation of the preferred embodiment of the invention.

FIG. 2 is a schematic top view of the touch display apparatus according to another variation of the preferred embodiment of the invention. Herein, FIG. 2 doesn't show the display panel. In the touch display apparatus in FIG. 2, the functional film 13 (including the first insulation layer and adhesive layer) and the conductive layer 17 (covering the functional film 13) are sequentially disposed on the first surface 121 of the touch panel 12. The functional film 13 is capable of an anti-scattering function while the conductive layer 17 is a transparent conductive layer, so that the touch display apparatus is capable of preventing both of the signal interference and the scattering. Besides, a touch surface T (opposite the first surface 121) of the touch panel 12 denotes the area of the touch panel 12 that allows a touch control operation.

As shown in FIG. 2, the touch display apparatus can further include a circuit connection board 15, which is electrically connected to the touch panel 12. The circuit connection board 15 is, for example but not limited to, a flexible printed circuit (FPC) board or rigid-flex board. A driving circuit (not shown) for driving the touch panel 12 can be disposed on the circuit connection board 15 or electrically connected to the touch panel 12 via the circuit connection board 15, so as to control the operation of the touch panel 12. Herein, the circuit connection board 15 is electrically connected to the touch panel 12 via an electrical connection element C. Besides, the conductive layer 17 (transparent conductive layer) is electrically connected to the circuit connection board 15 via another electrical connection element P, so as to be electrically connected to a ground terminal (not shown) of the circuit connection board 15. Thereby, the conductive layer 17 is capable of preventing the signal interference. Each of the electrical connection elements C and P can include a bus, wire, terminal, silver paste, solder or their any combination, for example. Accordingly, the conductive layer 17 is electrically connected to the electrical connection element C through the electrical connection element p and the circuit connection board 15. However, in other embodiments, the conductive layer 17 (transparent conductive layer) and the electrical connection element C can be electrically connected to each other by disposing a conductive material (such as conductive silver or solder) therebetween without using the electrical connection element P.

Besides, the touch display apparatus of the embodiment can further include an anti-electrostatic discharge layer AESD, which is adjacent to the edge of the functional film 13 and electrically connected to a ground terminal (not shown). The ground terminal can be disposed on the circuit connection board 15 or otherwise. The anti-electrostatic discharge layer AESD can prevent external static electricity from being damaging the touch display apparatus.

Figure 3:
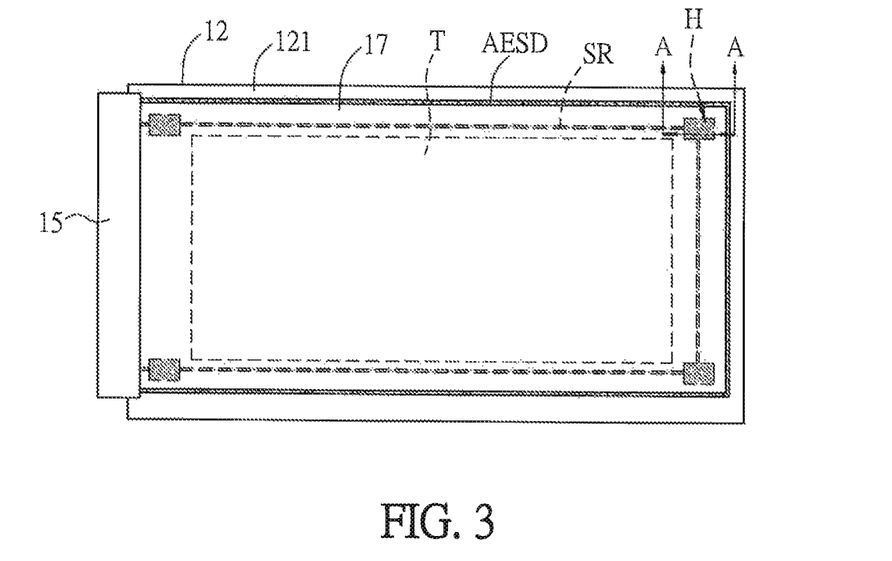
FIG. 3 is a schematic top view of the touch display apparatus according to another variation of the preferred embodiment of the invention.

FIG. 3 is a schematic top view of the touch display apparatus according to another variation of the preferred embodiment of the invention, and FIGS. 4A to 4D are schematic sectional diagrams of some variations of the section taken along the line A-A in FIG. 3. Herein, the display panel and the adhesive element are not shown in FIGS. 3 and 4A to 4D. Besides, fir corresponding to the touch panel in FIG. 1C, the functional film 13 and conductive layer 17 which are disposed below the touch panel 12 are still shown in FIGS. 4A to 4D. The functional film 13 includes the first insulation layer and the adhesive layer, and has an anti-scattering function. The conductive layer 17 is still a transparent conductive layer. To be noted, FIG. 3 doesn't show the functional film 13.

Figure 4A:
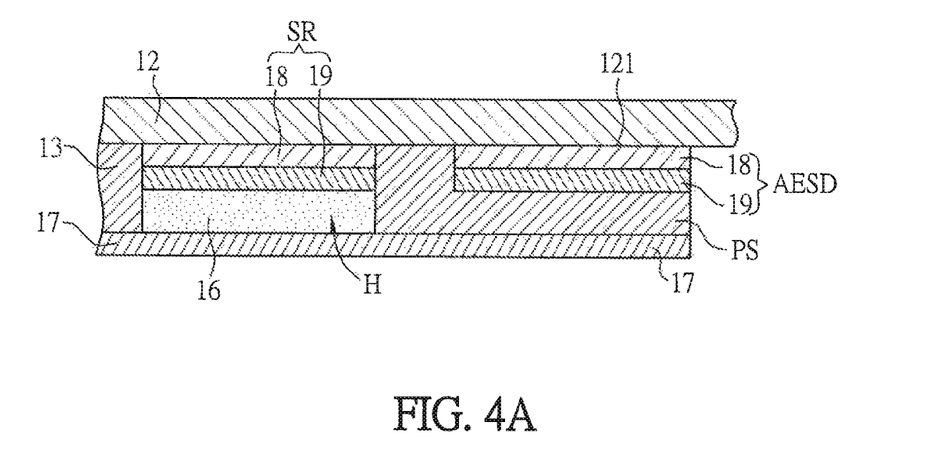
FIGS. 4A to 4D are schematic sectional diagrams of some variations of the section taken along the line A-A in FIG. 3.

As shown in FIGS. 3 and 4A, the touch display apparatus further includes a ground conductive layer SR (shielding ring). The ground conductive layer SR is adjacent to the edge of the functional film 13, and the conductive layer 17 is electrically connected to a ground terminal via the ground conductive layer SR (the related connection a will be clearly illustrated later). Herein, the ground terminal is disposed on the circuit connection board 15. In addition to the ground conductive layer SR, the touch display apparatus of this embodiment can further include an anti-electrostatic discharge layer AESD. The anti-electrostatic discharge layer AESD is adjacent to the edge of the functional film 13 and the edge of the ground conductive layer SR, and is electrically connected to another ground terminal. Each of the ground conductive layer SR and anti-electrostatic discharge layer AESD can include metal conductive material (such as a metal layer) or transparent conductive material (such as ITO or IZO), and can be a single-layer or multi-layer structure. In FIGS. 4A to 4D, each of the ground conductive layer SR and anti-electrostatic discharge layer AESD can be a combination of a metal layer 18 and a transparent conductive layer 19. However, in other embodiments, the ground conductive layer SR and anti-electrostatic discharge layer AESD can have the same or different material and number of the layer. The anti-electrostatic discharge layer AESD can be electrically connected to the ground terminal via a low-pass filter (such as composed of a resistance and a capacitance, not shown). The low-pass filter can filter out external high frequency signal, and thereby the touch panel 12 is capable of preventing the interference caused by external static electricity. However, in other embodiments, a back-to back Ziner diode can be used to function as an anti-electrostatic discharge layer. Or, in addition to the anti-electrostatic discharge layer AESD, a back-to back Ziner diode can be added to the apparatus to strengthen the anti-electrostatic effect of the touch display apparatus. In addition to being the intermediate for the ground terminal, the ground conductive layer SR also has different function from the anti-electrostatic discharge layer AESD. The ground. Conductive layer SR is mainly for the signal isolation, thus to block the external electrostatic discharge from sparking over the circuit of the touch panel 12, or block the electrostatic discharge of the anti-electrostatic discharge layer AESD from sparking over the circuit of the touch panel 12.

To be noted, in other embodiments, the touch display apparatus can be configured with the anti-electrostatic, discharge layer AESD and without the ground conductive layer SR, or with the ground conductive layer SR and without the anti-electrostatic discharge layer AESD.

In addition to the metal layer 18 and the transparent conductive layer 19, the touch display apparatus further includes a protection layer PS (insulation layer). The ground conductive layer SR, anti-electrostatic discharge layer AESD and conductive layer 17 are separated from one another by the protection layer PS.

As shown in FIG. 4A, the first insulation layer of the functional film 13 has a through hole H. The through hole H is filled with a conductive adhesive material 16 (such as silver paste or solder) so that the conductive layer 17 can be electrically connected to the ground conductive material SR via the through hole H. Because the ground conductive layer SR is electrically connected to the ground terminal, the conductive layer 17 can be capable of preventing signal interference when electrically connected to the ground terminal through the ground conductive layer SR.

Figure 4B:
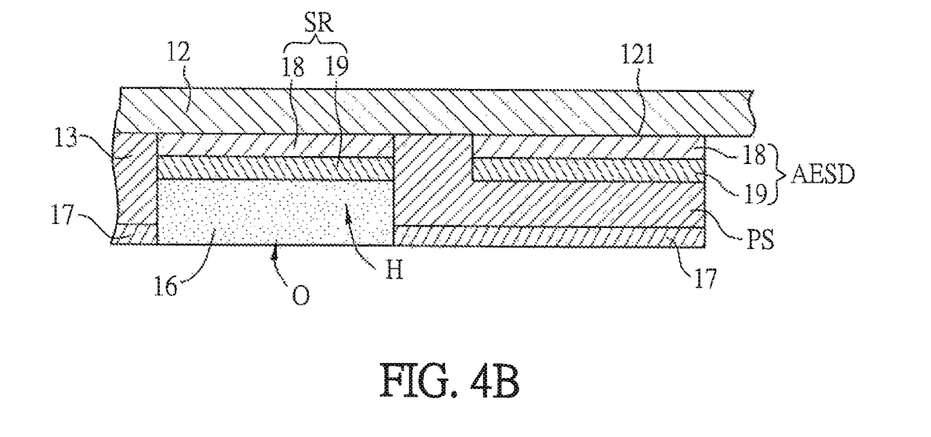

As shown in FIG. 4B, mainly different from FIG. 4A, the conductive layer 17 in FIG. 4B has another through hole O, and the through hole O is corresponding to the through hole H. The through holes H and O are both filled with the conductive adhesive material 16. So, the conductive layer 17 can be provided with a function of preventing signal interference when electrically connected to the ground terminal via the conductive adhesive material 16 in the through holes H and O and the ground conductive layer SR. The technical features of other components of the touch display apparatus in FIG. 4B can be known by referring to the same components of the touch display apparatus in FIG. 4A, and therefore they are not described here for conciseness.

Figure 4C:
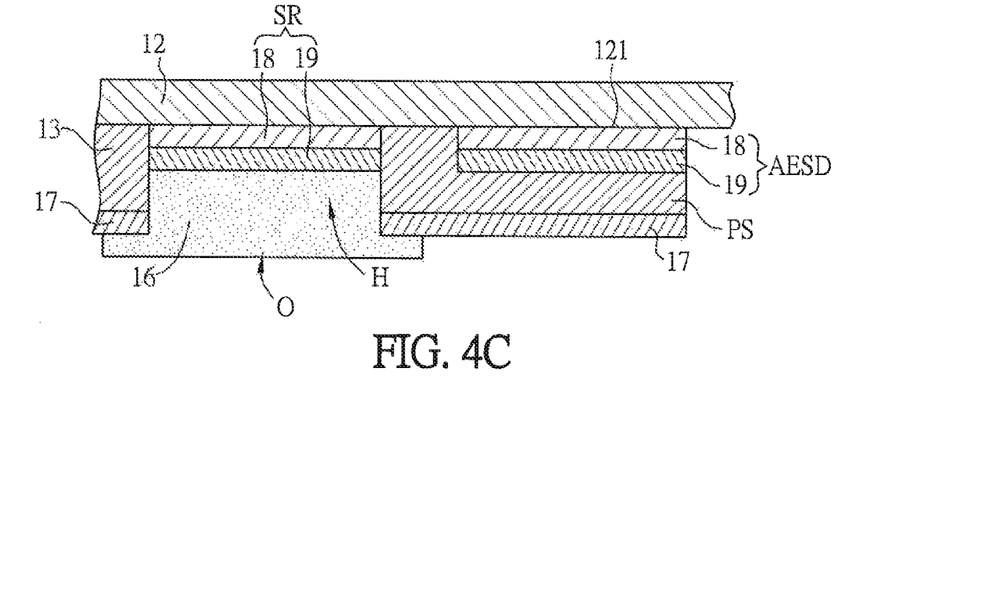

As shown in FIG. 4C, mainly different from FIG. 4B, the conductive adhesive material 16 in the through holes O and H extends to cover the conductive layer 17, and thereby the resistance exists between the conductive layer 17 and the ground conductive layer SR can be reduced for enhancing the electrical connection (ground) effect. The technical features of other components of the touch display apparatus in FIG. 4C can be known by referring to the same components of the touch display apparatus in FIG. 4B, and therefore they are not described here for conciseness.

Figure 4D:
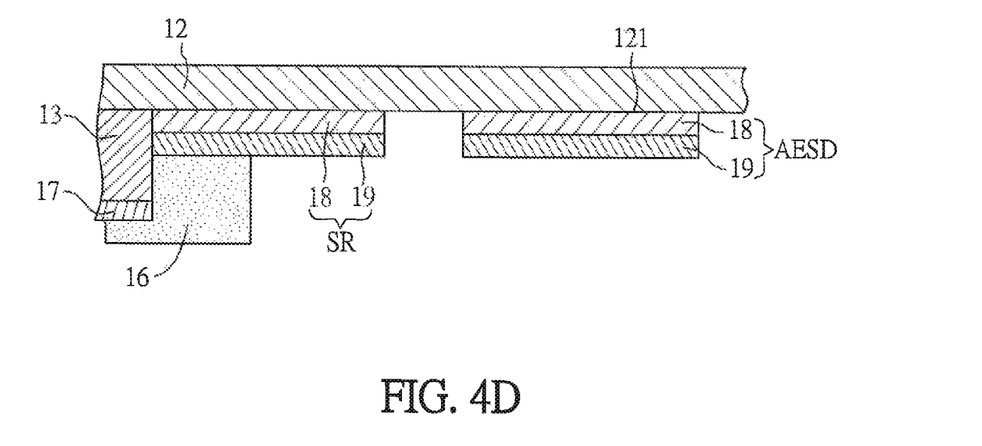

As shown in FIG. 4D, mainly different from FIG. 4A, the protection layer PS and the conductive layer 17 in FIG. 4D are not disposed on the anti-electrostatic discharge layer AESD and between the anti-electrostatic discharge layer AESD and ground conductive layer SR. Besides, the conductive adhesive material 16 is just disposed at the edge of the conductive layer 17 and extends to cover and contact the conductive layer 17, and therefore the conductive layer 17 can be electrically connected to the ground conductive layer SR. The technical features of other components of the touch display apparatus in FIG. 4D can be known by referring to the same components of the touch display apparatus in FIG. 4A, and therefore they are not described here for conciseness.

In summary, in the touch display apparatus of the invention, the functional film is disposed on the first surface of the touch panel, and the adhesive element is disposed at the edges of the display panel and touch panel and adheres to the display panel and touch panel. The adhesive element has an inner edge, and a minimum distance between the inner edge and an outer edge of the functional film is between 0 and 10 mm. Accordingly, a touch display apparatus with an innovative structure is provided by this invention.

Besides, in one embodiment of the invention, the functional film includes a first insulation layer and an adhesive layer. The first insulation layer adheres to the first surface of the touch panel via the adhesive layer, and the functional film has an anti-scattering function. Thereby, the touch display apparatus is provided with an anti-scattering function. In another embodiment of the invention, in addition to the functional film having an anti-scattering function, the touch display apparatus can further include a conductive layer, which covers the first insulation layer of the functional film. Accordingly, by the configuration of the functional film and conductive layer, the touch display apparatus can be capable of preventing both of the signal interference and scattering. In another embodiment of the invention, the touch panel further includes a second insulation layer and a conductive structure layer, and the conductive structure layer is disposed between the second insulation layer and the functional film. Thereby, the touch display apparatus can be capable of preventing both of the signal interference and scattering.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:
1. A touch display apparatus, comprising:
a display panel;
a touch panel disposed opposite the display panel and including a first surface facing the display panel;
a functional film disposed on the first surface of the touch panel and including an outer edge;
an adhesive element disposed at an edge of at least one of the display panel and the touch panel and adhering to the display panel and the touch panel, wherein the adhesive element includes an inner edge, and a minimum distance between the inner edge and the outer edge is larger than 0 and smaller than or equal to 10 mm; and a ground conductive layer disposed on the first surface of the touch panel, wherein the ground conductive layer is located between the functional film and the adhesive element.

2. The touch display apparatus as recited in claim 1, wherein the minimum distance between the inner edge and the outer edge is between 0.1 mm and 5 mm.

3. The touch display apparatus as recited in claim 1, wherein the display panel includes a first substrate, a second substrate and an optical film, the first substrate and the second substrate are disposed oppositely, and the optical film is disposed on the surface of the second substrate facing the touch panel.

4. The touch display apparatus as recited in claim 3, wherein a minimum distance between the functional film and the optical film is between 0 and 0.3 mm.

5. The touch display apparatus as recited in claim 1, wherein the functional film includes a first insulation layer and an adhesive layer.

6. The touch display apparatus as recited in claim 5, wherein the functional film has an anti-scattering function.

7. The touch display apparatus as recited in claim 5, wherein the material of the first insulation layer of the functional film includes polyethylene terephthalate (PET), triacetyl cellulose (TAC), poly-methylmethacrylate (PMMA) or their any combination.

8. The touch display apparatus as recited in claim 5, further comprising:

a conductive layer covering the first insulation layer of the functional film.

9. The touch display apparatus as recited in claim 8, wherein the conductive layer is electrically connected to a ground terminal.

10. The touch display apparatus as recited in claim 8, wherein the conductive layer is electrically connected to a ground terminal through the ground conductive layer.

11. The touch display apparatus as recited in claim 10, wherein the ground conductive layer is electrically connected to the conductive layer through a conductive adhesive material.

12. The touch display apparatus as recited in claim 11, wherein the conductive adhesive material is disposed at the edge of the conductive layer and contacts the conductive layer.

13. The touch display apparatus as recited in claim 11, wherein the first insulation layer of the functional film has a through hole, and the conductive adhesive material extends to cover the conductive layer via the through hole.

14. The touch display apparatus as recited in claim 11, wherein the first insulation layer of the functional film has a through hole, and the conductive layer is electrically connected to the ground conductive layer via the through hole.

15. The touch display apparatus as recited in claim 10, further comprising:

an anti-electrostatic discharge layer which is adjacent to the edge of the ground conductive layer and electrically connected to another ground terminal.

16. The touch display apparatus as recited in claim 5, wherein the touch panel further includes a second insulation layer and a conductive structure layer.

17. The touch display apparatus as recited in claim 5, further comprising:

an anti-electrostatic discharge layer which is adjacent to the edge of the functional film and electrically connected to a ground terminal.

18. The touch display apparatus as recited in claim 1, further comprising:

an anti-electrostatic discharge layer which is adjacent to the edge of the functional film and electrically connected to a ground terminal.

* * * * *